United States Patent [19]

Johnson, Jr.

[11] 4,256,045
[45] Mar. 17, 1981

[54] APPARATUS AND METHOD FOR TREATING A GAS WITH A LIQUID

[76] Inventor: Allen S. Johnson, Jr., Post Office Drawer 1037, Salisbury, N.C. 28144

[21] Appl. No.: 112,423

[22] Filed: Jan. 16, 1980

[51] Int. Cl.³ .............................................. F23J 11/00
[52] U.S. Cl. ........................................ 110/345; 55/73;
55/91; 55/96; 55/99; 55/233; 55/243; 55/479;
55/267; 55/312; 432/14; 432/72; 432/106;
34/79; 110/215; 110/203; 423/242
[58] Field of Search ................... 55/479, 73, 91, 233,
55/90, 228, 89, 385 R, 312, 267, 315, 243, 96,
99; 423/242 R–244; 432/106, 14, 72; 34/79, 80;
110/215, 345, 203; 422/168, 171

[56] References Cited
U.S. PATENT DOCUMENTS

| 231,177 | 8/1880 | Klonne | 261/94 |
| 339,669 | 4/1886 | Lillie | 55/233 |
| 1,798,307 | 3/1931 | Cooper | 261/96 |
| 2,021,936 | 11/1935 | Johnston | 423/242 R |
| 3,151,187 | 9/1964 | Compte | 261/DIG. 72 |
| 4,120,645 | 10/1978 | Heian et al. | 423/244 A |

FOREIGN PATENT DOCUMENTS

| 725858 | 10/1942 | Fed. Rep. of Germany | 55/419 |
| 2554096 | 6/1977 | Fed. Rep. of Germany | 55/89 |
| 2627797 | 1/1978 | Fed. Rep. of Germany | 55/79 |
| 50-10548 | 4/1975 | Japan | 55/73 |
| 20667 | of 1913 | United Kingdom | 55/73 |
| 687206 | 2/1953 | United Kingdom | 55/233 |

Primary Examiner—Bernard Nozick
Attorney, Agent, or Firm—Bell, Seltzer, Park & Gibson

[57] ABSTRACT

The present invention provides a method and apparatus for continuously treating a flowing gas with a liquid to remove unwanted materials from the gas. Packing elements are directed downwardly along a predetermined zigzag path of travel, with the packing elements being maintained in the form of a relatively thin layer. A liquid is directed onto the layer of packing elements while a flowing gas is directed upwardly along a sinuous path of travel repeatedly passing back and forth through the downwardly moving layer of packing elements successively from opposite sides thereof. The packing elements are discharged from the lower end of the path of travel while clean packing elements are directed into the upper end to replace those which are discharged. The discharged packing elements are cleaned and recycled for reuse.

28 Claims, 4 Drawing Figures

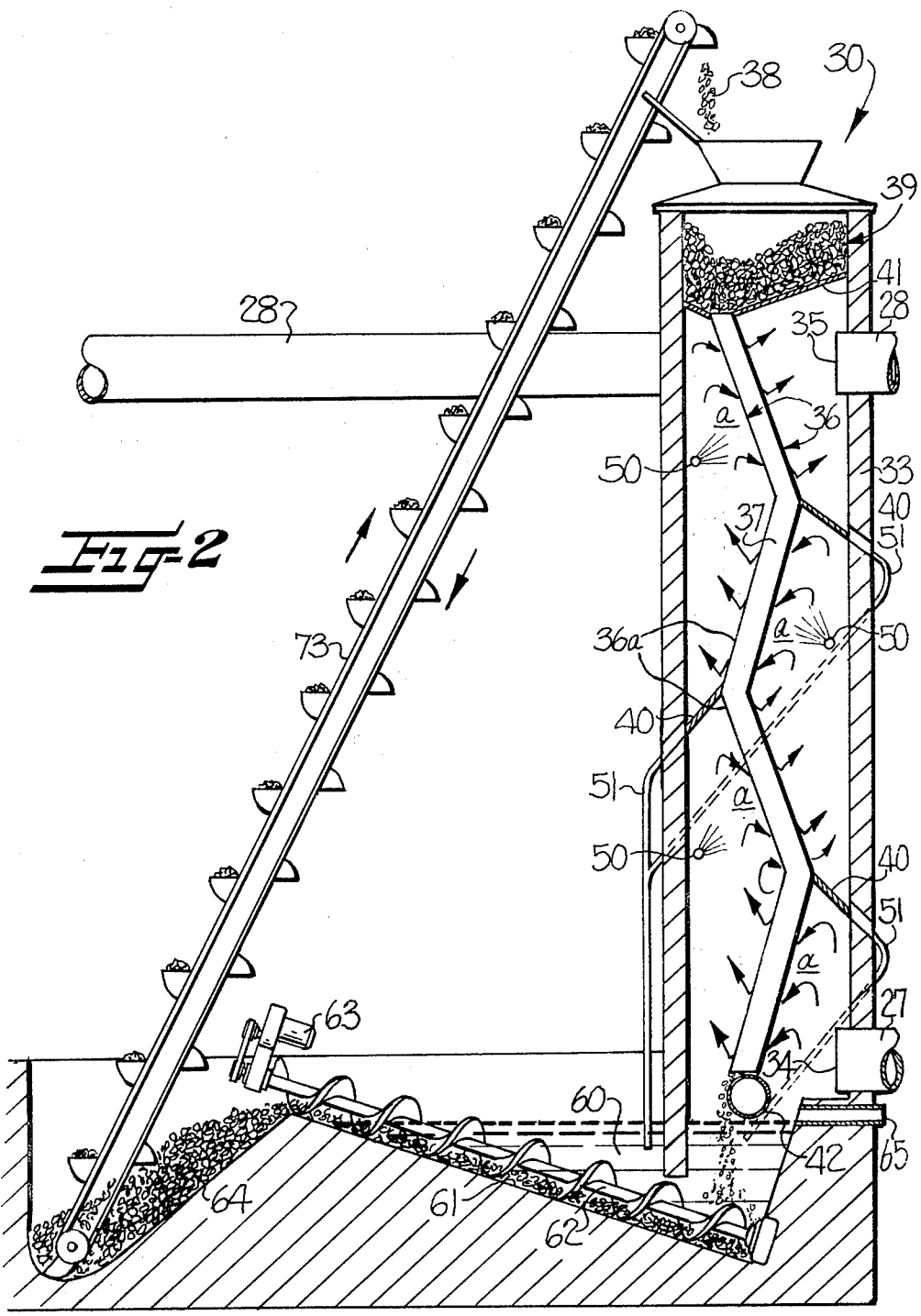

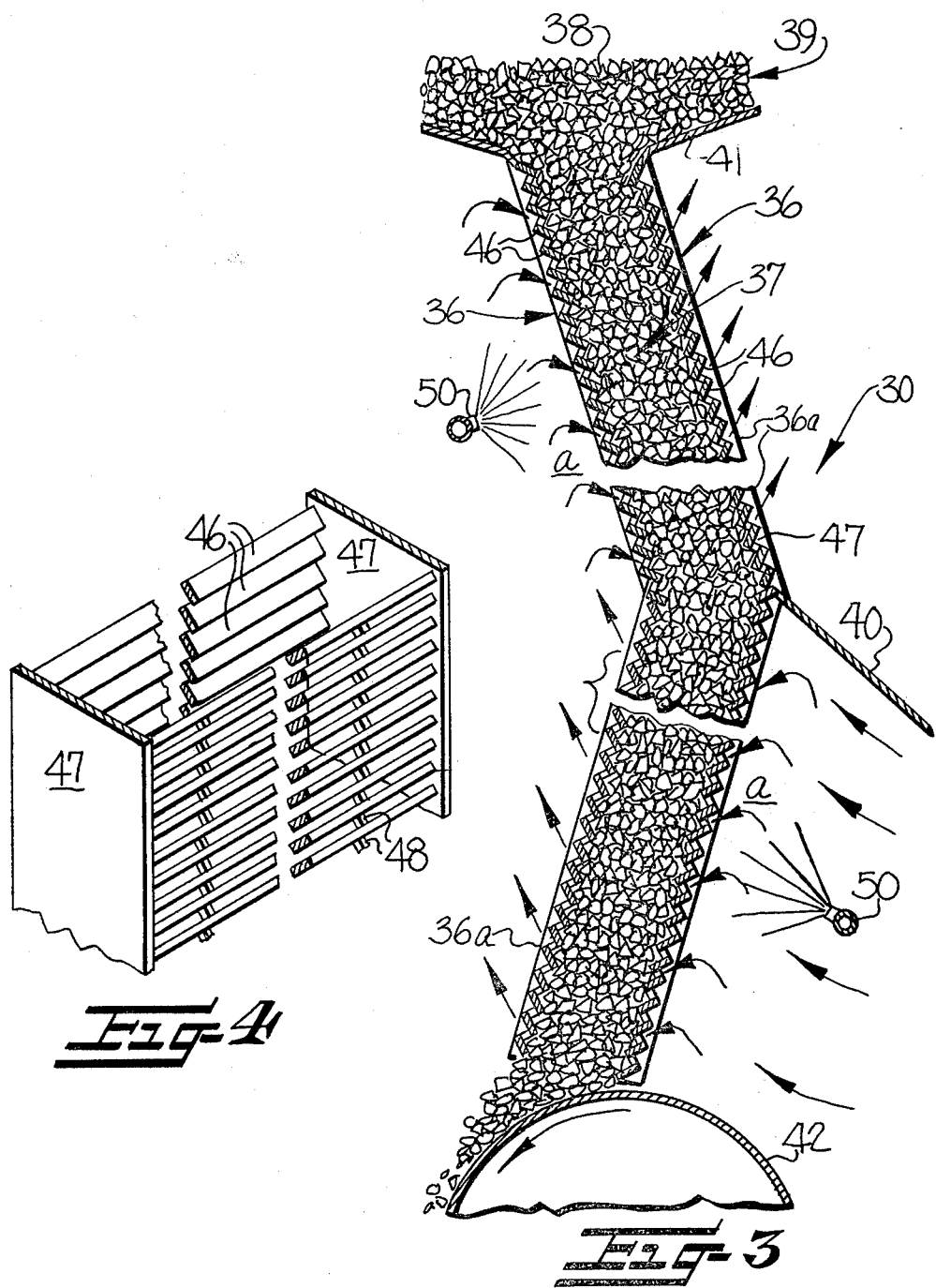

APPARATUS AND METHOD FOR TREATING A GAS WITH A LIQUID

FIELD OF THE INVENTION

This invention relates to an apparatus and method for treating a gas with a liquid, and more particularly to an improved apparatus and method for treating a flowing gas to remove unwanted materials from the gas, such as dust or certain gaseous components.

BACKGROUND OF THE INVENTION

A known process for selectively removing certain gaseous components from a flowing gas involves directing the flowing gas through the interstices of a mass of solid packing elements over which a liquid is flowing. The packing elements serve to assist in distributing the liquid and providing a large liquid surface area for contact by the gas. This general principle is commonly employed in various types of packed tower absorbers, gas scrubbers, and the like.

One of the problems which may be experienced with this type of arrangement is that the interstices between packing elements may become clogged after a period of operation, due to dust which is contained in the gas stream or as a result of chemical reactions which taken place in which a solid precipitate is formed. It then becomes necessary to remove and clean the packing elements in order to remove the clogging and restore the system to operation.

One of the objects of the present invention is to overcome the problem of clogging in a gas-liquid treatment apparatus utilizing a mass of packing elements by providing an apparatus and method in which the packing elements can be readily removed and replaced in the event that a clogging condition occurs, or to prevent clogging from occurring.

A further object of the invention is to provide an apparatus and method of the type described wherein provision is made for removing, cleaning and reusing the packing elements so as to thereby avoid the aforementioned clogging problem.

Still another object of this invention is to provide an apparatus and method for treating a flowing gas with a liquid while providing highly effective contact of the gas and liquid for enhanced efficiency of operation.

Still another object of this invention is to provide an apparatus and method of the type described which is useful not only for removing gaseous components from a flowing gas, but which may also be utilized for removing particulate materials such as dust which may be entrained in a flowing gas stream.

SUMMARY OF THE INVENTION

In accordance with the invention, a mass of packing elements is arranged for being directed downwardly along a predetermined path of travel, with the packing elements being maintained in the form of a relatively thin layer. A liquid is directed onto the layer of packing elements while a flowing gas is also directed upwardly along a predetermined sinuous path of travel repeatedly passing back and forth through the layer of packing elements successively from opposite sides thereof so as to thus provide a highly effective contact of the gas with the liquid. To prevent clogging of the interstices between the packing elements by an accumulation of foreign material on the packing elements, such as an accumulation of dust or solid precipitates for example, the packing elements are periodically or continuously discharged from the lower end of the predetermined path of travel while clean packing elements are directed into the upper end of the passageway to replace those which are discharged.

In accordance with one aspect of the invention, means is provided for receiving the packing elements which are discharged from the lower end of the passageway and for cleaning the packing elements to remove foreign materials therefrom, and then redirecting the packing elements into the upper end of the passageway so that the packing elements are thus cleaned and recycled through the system. This is accomplished, for example, by the provision of a liquid bath at the base of the apparatus into which the packing elements are received as they are discharged from the lower end of the passageway. A conveyor system removes the packing elements from the liquid bath and transports them to the upper end of the passageway to be reintroduced into the passageway.

The apparatus for treating a flowing gas in accordance with the present invention, referred to herein as a scrubber apparatus for covenient reference, includes means defining an elongate generally vertically extending gas permeable passageway of relatively narrow cross section adapted for receiving a mass of packing elements at the upper end thereof and confiningly directing the packing elements along a predetermined downward path of travel in the form of a relatively thin layer. Means is provided for discharging the packing elements from the lower end of the passageway, so that the packing elements can be moved along the passageway in a downward direction in the form of a relatively thin layer. Means is also provided for directing a liquid onto the packing elements contained within the passageway so as to wet the packing elements to provide a large liquid surface area for contact by the gas. The flowing gas is directed upwardly along a sinous path of travel repeatedly passing laterally back and forth through the gas permeable passageway and repeatedly through the thin layer of packing elements therein to thereby provide highly effective contact of the gas with the liquid on the packing elements.

The elongate passageway through which the packing elements are directed is of a nonlinear zigzag configuration for directing the packing elements laterally back and forth in the form of a relatively thin downwardly moving layer along a series of oppositely directed downwardly inclined courses of travel. The flowing gas is directed upwardly and successively through each of the oppositely directed downwardly inclined courses of travel of the layer of packing elements so that the gas repeatedly flows back and forth through the thin layer of packing elements in the passageway from opposite sides thereof to provide highly effective contact of the gas with the liquid on the packing elements. Preferably, the liquid is directed into the layer of packing elements by discharging the liquid into the stream of gas at one or more locations along the sinuous path of travel of the gas.

The scrubber apparatus and method of this invention may be effectively utilized n various applications where a sulfur containing fuel is burned, with the scrubber apparatus serving to remove sulfur dioxide and airborne particulate material from the combustion gases prior to discharge thereof to the atmosphere. For example, the scrubber apparatus is highly desirable in an aggregate heat treating operation wherein a sulfur containing fuel is burned and the combustion gases are directed through a rotary kiln into contact with the aggregate material for heating the same, with the combustion gases being subsequently discharged to the atmosphere.

BRIEF DESCRIPTION OF THE DRAWINGS

Some of the features and advantages of the invention having been stated, others will become apparent as the description proceeds when taken in connection with the accompanying drawings, in which

FIG. 2 is a side cross sectional view of the scrubber apparatus;

FIG. 3 is an enlarged detailed cross sectional view of a portion of the scrubber apparatus; and FIG. 4 is a detailed perspective view showing the construction of the louvered retaining walls in the interior of the scrubber apparatus.

DESCRIPTION OF THE ILLUSTRATED EMBODIMENT

Figure 1:
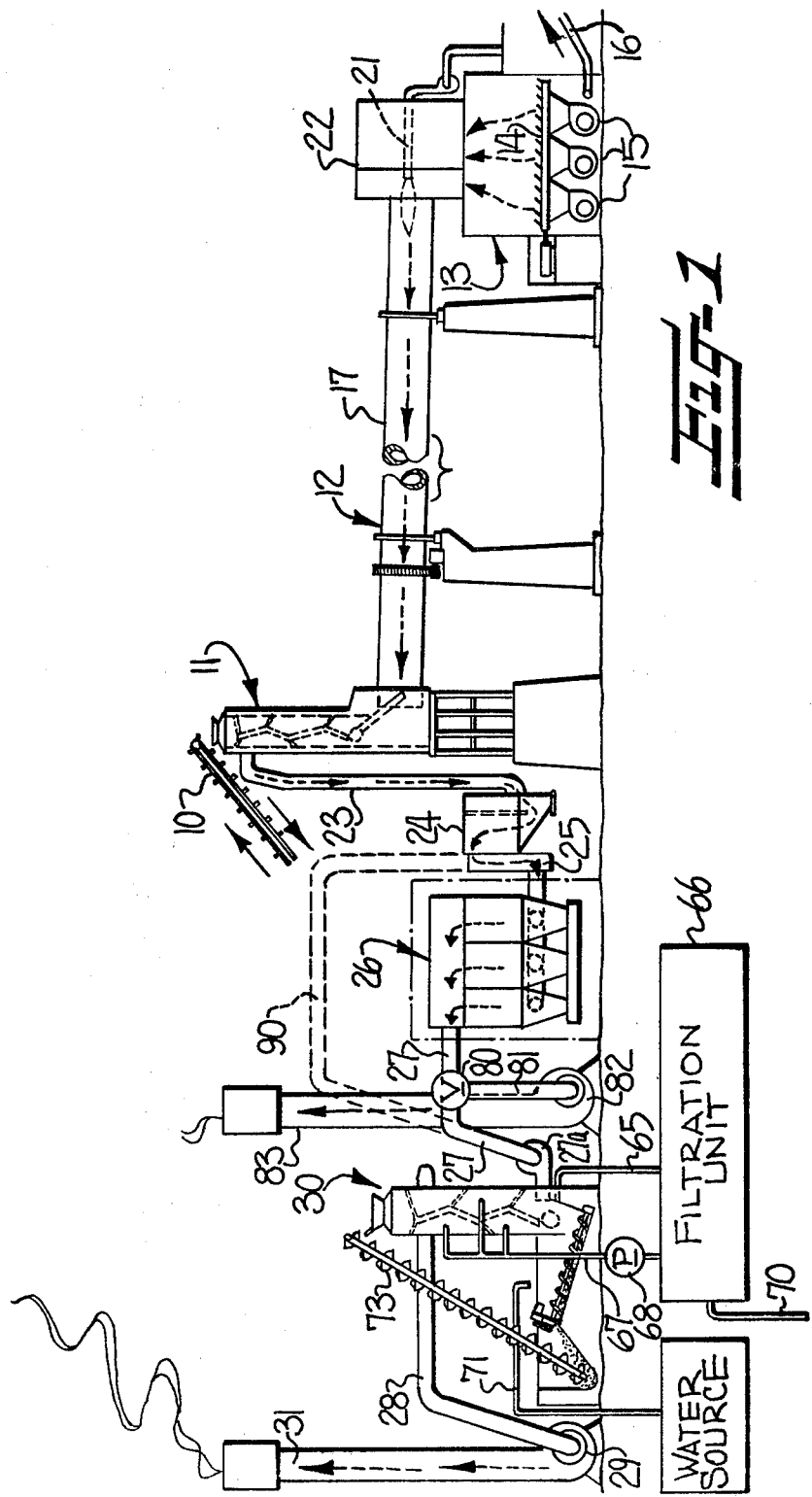
FIG. 1 is a somewhat schematic elevational view showing an assembly of apparatus for processing aggregate in a kiln, and showing a scrubber apparatus in accordance with this invention for scrubbing the waste combustion gases from the kiln prior to discharge to the atmosphere.

For purposes of illustration, the scrubber apparatus and method of this invention are shown and described herein in association with an assembly of apparatus for processing and heat treating an aggregate material through a rotary kiln which is heated by a sulfur containing fuel, and in this particular arrangement the scrubber apparatus is utilized for removing sulfur dioxide from the waste combustion gases prior to discharge to the atmosphere. However, persons skilled in the art will recognize that the present invention is useful in various other applications where it is desirable to remove from a flowing gas unwanted materials such as dust or certain gaseous components.

Referring now more particularly to the drawings, the assembly of apparatus shown in FIG. 1 may be useful, for example, for calcining limestone or for roasting various other kinds of minerals or ores. The apparatus includes a conveyor 10 for conveying the aggregate from a supply source, not shown, to the upper end of an aggregate preheater, generally indicated by the reference character 11. The aggregate is advanced slowly downwardly through the preheater, while being contacted with heated gases from a rotary kiln, generally indicated by the reference character 12, so as to preheat the aggregate by contact with the waste heated gases from the rotary kiln prior to the aggregate being introduced into the kiln 12. The preheater apparatus 11 is the subject of my copending application Ser. No. 88,522 filed Oct. 26, 1979 and entitled APPARATUS AND METHOD FOR TREATING AN AGGREGATE MATERIAL WITH A FLOWING GAS and reference may be made to this copending application for a more complete description of the construction and operation of the preheater apparatus.

After being preheated in the preheater apparatus 11, the aggregate is then advanced longitudinally through the rotary kiln 12 while being heated to the desired temperature, with the aggregate being discharged from the opposite end of the kiln and deposited in an aggregate cooler, generally indicated by the reference character 13. The cooler 13 is of a known construction and includes a grate 14 on which the heated aggregate is deposited, and a plurality of fans 15 mounted for directing air through the grate 14 and into contact with the heated aggregate for cooling the same. The thus cooled aggregate is removed from the grate 14 and deposited on a conveyor 16 which conveys the aggregate elsewhere for storage and subsequent use.

The air which passes through the aggregate in the cooler 13 is heated by the aggregate and is directed from the cooler 13 into one end of the elongate rotary kiln 12. The kiln, more particularly, includes an elongate hollow tubular body 17 which is oriented on a gradual incline as is conventional so that rotation of the tubular body will gradually advance the aggregate longitudinally through the kiln. The kiln 12 further includes a burner 21, fired by powdered coal or other suitable fuel, and mounted in a suitable housing 22 at the discharge end of the tubular body 17. The burner 21 directs a flame longitudinally into the interior of the tubular body 17 of the kiln for thus heating the aggregate contained in the kiln to a desired temperature. The heated air from the fans 15 and the combustion gases from the burner 21 travel longitudinally through the hollow tubular body 17 of the kiln in a direction countercurrent to the direction of the aggregate therethrough and are discharged from the opposite end of the tubular body into the preheater 11. Upon being discharged from the rotary kiln, the heated air and combustion gases are directed upwardly through the preheater 11 and are brought into contact with the incoming aggregate for thus preheating the aggregate prior to its introduction into the kiln. The gases are discharged from the preheater 11 at the upper end thereof and are directed via a duct 23 to a dust collection box 24 where heavier particles of dust and other particulate matter are separated from the flowing gas stream.

The gases are then directed via a duct 25 to a suitable filtration apparatus, generally indicated by the reference character 26. In the embodiment of the invention illustrated, the filtration apparatus 26 is a baghouse of a type conventionally employed for removing dust and other fine particulate material from a stream of flowing gas, the baghouse containing a plurality of elongate tubular baglike filters. From the filtration apparatus 26 a fan 27a causes the gases to be directed along a duct 27 to the scrubber apparatus of the present invention, which is generally indicated by the reference character 30. The scrubber apparatus 30 serves for removing sulfur dioxide from the gases prior to discharge thereon to the atmosphere, as will be described more fully later. From the scrubber apparatus 30, the gases are directed along a duct 28, through a fan 29 which serves for inducing the flow of gases through the scrubber apparatus, with the gases then being discharged to the atmosphere via a smokestack 31.

In order to allow the kiln 12 and filtration apparatus 26 to be operated in the event that the scrubber apparatus is shut down for any reason, as for maintenance, a valve 80 is provided in the duct 27, which may be utilized for diverting the flow of gases through branch duct 81 to a supplemental fan 82 and supplemental smokestack 83.

Although illustrated, the filtration apparatus 26 is not essential to the operation of the overall system, and may be omitted in some applications. In this event, the gases may be directed along a duct 90 indicated by the broken lines so as to bypass the filtration appartus 26 and flow directly from the duct collection box 24 to the scrubber apparatus, in which case the scrubber apparatus will serve not only for removing sulfur dioxide from the gas stream, but will also serve for removing any particulate material or dust which may be entrained in the air stream.

Referring now more particularly to the scrubber apparatus 30, as best illustrated in FIG. 2, it will be seen that the scrubber apparatus includes an elongate upright hollow housing 33, which in the illustrated embodiment is of a circular cross section. Housing 33 has a gas inlet opening 34 adjacent the lower end thereof which is communicatively connected to the duct 27. A gas outlet opening 35 is provided in the housing 33 adjacent the upper end thereof through which the flowing gases leave the housing and are directed along duct 28 and are subsequently discharged to the atmosphere.

Located within the housing 33 is a pair of longitudinally extending retaining walls 36 which are mounted in opposing, closely spaced relation to one another to define therebetween an elongate vertically extending passageway or chute 37 for receiving a mass of packing elements 38 therein. The elongate passageway 37 is of a relatively narrow cross section for receiving the packing elements at the upper end thereof and maintaining the packing elements in the form of a relatively thin layer or bed, as for example four to five inches thick, as the packing elements are directed downwardly along the passageway 37. As illustrated, the retaining walls 36 are of a nonlinear zigzag configuration so that the thin layer of packing elements is directed along a sinuous or zigzag path of travel in the course of its downward movement along the narrow passageway.

The nonlinear zigzag retaining walls 36 are each comprised of a series of inclined segmental wall portions 36a, with each segmental wall portion being inclined at a relatively small angle from the vertical axis. Preferably, the angle of incline of the respective segmental wall portions 36a is within the range of about 10° to about 25° from the vertical axis, and most desirably about 17° to 18°. The respective segmental wall portions which collectively define each retaining wall are so arranged that alternate segmental wall portions are inclined to one side of the vertical axis, with the intervening segmental wall portions being inclined to the opposite side of the vertical axis. The thin layer of packing elements is thus directed laterally back and forth in opposite directions along a series of downwardly inclined courses of travel as it progresses downwardly through the elongate passageway 37.

The retaining walls 36 which form the elongate passageway or chute 37 are of a gas permeable construction to freely allow the gases to flow through the thin layer of packing elements. As illustrated, the arrangement of the zigzag gas permeable retaining walls 36 within the hollow interior of the housing 33 is such that the gases flowing along the interior of the housing are repeatedly directed through the retaining walls 36 and into contact with the thin layer of packing elements trapped therebetween. More particularly, it will be seen that a series of imperforate baffle plates 40 extend outwardly from the retaining walls 36 to the surrounding housing at spaced locations along the longitudinal extent of the retaining walls so as to obstruct the flowing gases and direct the flowing gases in a sinuous path of travel which repeatedly passes laterally back and forth through the retaining walls and thus repeatedly directs the gases upwardly into and through the downwardly advancing thin layer of packing elements.

A wall 41 is provided at the upper end of the housing 33 extending between the housing and the uppermost ends of the retaining walls 36 to define a storage hopper or reservoir 39 for receiving a supply of the packing elements 38 and directing the packing elements into the upper end of the elongate passageway 37. An elongate cylindrical roll 42 is positioned beneath the lower end of the retaining walls 36 in an obstructing relation to the lower end of the passageway so that the passageway remains substantially filled with packing elements. The roll 42 is rotatably driven as necessary, either periodically or continuously, when it is desired to discharge the packing elements from the lower end of the passageway.

As best seen in FIGS. 3 and 4, the gas permeable retaining walls 36 which define the passageway 37 are of a louvered construction and comprised of a series of parallel laterally extending slats 46 which extend substantially the full width of the passageway 37 and are connected to opposing solid end walls 47. The slats 46 in each series are spaced apart from one another to readily permit the flow of gas therebetween, with reinforcing spacers 48 being mounted between adjacent slats at spaced locations across the width thereof to provide enhanced structural rigidity to the retaining wall. As illustrated, the slats 46 are inclined angularly downwardly in the direction of movement of the packing elements and are convergingly arranged with the opposing series of slats. The slats of each series are positioned in overlapping relation to one another to assist in guiding the packing elements 38 along their downward path of travel while confiningly retaining the packing elements within the elongate passageway and while also readily permitting the flow of gas into and through the thin layer of packing elements.

As the gas flows along its sinuous upward path repeatedly through the layer of packing elements, an aqueous liquid is directed into the passageway 37 for wetting the packing elements contained therein and thereby providing highly effective contact of the liquid with the flowing gas. Thus, the sulfur dioxide which is contained in the gas is absorbed in the aqueous liquid. Additionally, any particulate material which might be contained in the gas would become trapped on the wetted packing elements. Preferably, the liquid is directed into the passageway 37 by spraying the liquid into the flowing gas stream on the inflow side of the gas permeable retaining walls at at least one, and desirably several, locations along the sinuous path of travel of the gas. As illustrated, a series of spray nozzles 50 are located at spaced locations along the longitudinal extent of the housing 33, with each nozzle 50 being located a short distance away from the inflow side of the retaining wall 36. The aqueous liquid is carried by the flowing air into the passageway 37 and then flows downwardly over the packing elements contained therein, with the liquid being discharged at the lowermost end of the passageway 37. Any excess liquid which is not carried into the passageway 37 is received on the baffle plates 40 and collected and directed along conduits 51 to a reservoir pool 60 at the lower base of the housing 33.

As earlier noted, the respective segmental wall portions 36a which collectively define the retaining walls 36 are oriented at an incline with respect to the vertical axis so that the packing elements move downwardly along an inclined sinuous or zigzag path of travel. The upward flow of gases through the respective segmental walls portions is such that the gases always enter the thin layer of packing elements on the lower of the pair of opposing walls, and emerge from the layer through the upper of the pair of opposing walls. Thus, as indicated by the air flow arrows a in FIG. 3, the louvered construction of the segmental wall portions 36a causes the gases to be directed into the inclined thin layer of packing elements angularly downwardly in generally the same direction as the direction of movement of the packing elements and the downwardly flowing liquid. The flow of the gas thus assists in the downward movement of the packing elements and in the downward movement of the liquid flowing across the packing elements, rather than interfering with or opposing such movement as might occur if the gas flow passed through the inclined layer of packing elements in a different direction. By directing the air flow angularly through the layer of packing elements, the louvered construction of the wall portions 36a also serves to increase the distance which the gas must travel through the layer, thus enhancing contact between the gas and the liquid.

The packing elements 38 which are utilized in the scrubber apparatus may be of any suitable material. Preferably, because of the low expense and ready availability, crushed rocks are used as the packing material. The illustrated apparatus is particularly suited for using rocks within the size range of from about ¼ inch to about 1½ inches.

Over a period of time, the packing elements which are contained within the passageway 37 may tend to collect foreign materials thereon, such as dust which is entrained in the air stream or precipitates formed as a result of a chemical reaction between elements contained in the liquid and in the flowing gas. However, the capability for movement of the packing elements through the scrubber apparatus permits the periodic or continuous replacement of the packing elements in the passageway 37 with fresh packing elements so as to thereby maintain the interstices between the packing elements free from clogging. The packing elements may, if desired, be directed through the scrubber apparatus and then discarded after use. This is practical because of the low cost of the crushed rocks utilized as the packing elements. In this instance, the storage hopper 39 serves for replenishing the passageway 37 with fresh packing elements as packing elements are discharged from the lower end of the passageway.

However, in accordance with a preferred embodiment of the invention and as illustrated herein, the replenishing of the passageway 37 with fresh packing elements is carried out using packing elements which have been previously processed through the system, cleaned, and then recycled. More particularly, means is provided for receiving the packing elements which are discharged from the lower end of the passageway 37 and for cleaning the packing elements to remove any foreign materials therefrom. After cleaning, the packing elements are redirected into the upper end of the passageway 37. As illustrated, the cleaning of the packing elements is accomplished by discharging the packing elements into a pool 60 located at the base of the housing 33. The pool 60 is filled with the aqueous liquid being circulated through the scrubber apparatus and has an inclined trough-shaped bottom 61 in which there is mounted an inclined screw conveyor 62. The screw conveyor is rotatably driven by a drive motor 63 for conveying the packing elements up the inclined bottom and out of the pool of liquid, and into a receiving hopper 64. The liquid which is contained in the pool 60 is kept in constant motion so that any fine particulate material or other foreign matter present on the packing elements will be washed off of the packing elements and maintained in suspension in the pool of liquid. The liquid is drawn off from an outlet pipe 65 and is circulated through a filtration unit 66 (FIG. 1) to remove the foreign particulate material from the liquid. The filtered liquid is then recirculated to the spray nozzles 50 via a return pipe 67 and pump 68 for being again directed onto the packing elements in the passageway 37. A portion of the filtered liquid is drawn off via a pipe 70 either periodically or continuously in order to maintain the proper concentration of the liquid for effective removal of the sulfur dioxide, with makeup water being provided to the pool 60 as necessary via a pipe 71.

A bucket conveyor 73 extends from the receiving hopper 64 to the upper end of the housing 33 for conveying the packing elements upwardly from the receiving hopper 64 and depositing the same in the storage hopper 39 at the upper end of the housing 33. Thus the packing elements are repeatedly recycled or recirculated through the scrubber apparatus.

It will thus be seen that the present invention provides a highly desirable and effective method and apparatus for treating a flowing gas with a liquid to remove unwanted materials from the gas. The apparatus of this invention has utility in a variety of applications where it is desirable to remove gases such as sulfur dioxide or particulate material such as dust from a flowing gas stream.

In the drawings and specification there have been set forth preferred embodiments of the invention, and although specific terms are employed they are used in a generic and descriptive sense only and not for purposes of limitation.

What is claimed is:

1. Apparatus for treating a flowing gas with a liquid to remove unwanted materials therefrom, said apparatus comprising means defining an elongate generally vertically extending gas permeable passageway of relatively narrow cross sectio adapted for receiving a mass of packing elements at the upper end thereof and maintaining the same in the passageway in the form of a relatively thin layer, said means comprising a pair of gas permeable retaining walls of nonlinear zigzag configuration extending generally vertically in opposing, spaced relation to one another to define therebetween said elongate vertically extending passageway for the packing elements, means for directing a liquid onto the packing elements contained within said passageway, means for directing a flowing stream of gas upwardly along a predetermined sinuous path of travel repeatedly passing laterally back and forth through said gas permeable passageway and repeatedly through the thin layer of packing elements in said passageway to provide highly effective contact of the gas with the liquid on said packing elements, means for discharging packing elements from the lower end of said passageway so as to cause the layer of packing elements to move downwardly along said passageway, and means associated with the upper end of said passageway for replenishing the passageway with packing elements, the discharging and replenishing of the packing elements thus serving to maintain the interstices between the packing elements in said passageway free from clogging so as to achieve highly effective contact of the flowing gas with the liquid.

2. The apparatus as set forth in claim 1 wherein said means for replenishing the passageway with packing elements includes means for receiving the packing elements which are discharged from the lower end of said passageway and redirecting the packing elements to the upper end of said passageway.

3. Apparatus as set forth in claim 2 wherein said means for receiving the packing elements and redirecting the same to the upper end of said passageway includes means for cleaning the packing elements to remove foreign materials therefrom prior to directing the packing elements to the upper end of the passageway.

4. Apparatus as set forth in claim 3 wherein said means for cleaning the packing elements comprises a liquid bath positioned for receiving the packing elements therein and rinsing the packing elements of foreign materials thereon.

5. The apparatus as set forth in claim 1 wherein said means for directing a liquid onto the packing elements comprises nozzle means positioned along the inflow side of said means defining said gas permeable passageway at at least one location therealong for discharging the liquid into the stream of gas flowing into the layer of packing elements so as to thereby wet the packing elements with the liquid.

6. The apparatus as set forth in claim 5 wherein said nozzle means is positioned at a plurality of vertically spaced locations along said means defining said vertically extending passageway so as to thereby repeatedly wet the packing elements located in said passageway.

7. The apparatus as set forth in claim 1 wherein each of said opposing retaining walls is of louvered construction and comprises a series of laterally extending slats, the respective slats in each series being spaced apart from one another to readily permit the flow of gas therebetween while confiningly retaining the packing elements within said passageway.

8. The apparatus as set forth in claim 7 wherein the slats of the opposing series are convergingly arranged and inclined angularly downwardly in the direction of movement of the packing elements to assist in guiding the packing elements in their downward path of travel along the passageway while also confiningly retaining the liquid within the passageway and while also readily permitting the flow of gas into and through the thin layer of packing elements.

9. Apparatus for treating a flowing gas with a liquid to remove unwanted materials therefrom, said apparatus comprising an upright hollow housing having an inlet opening in a lower portion thereof for receiving a flowing stream of gas and an outlet opening in an upper portion thereof for discharge of the gas, a pair of opposing gas permeable louvered retaining walls of nonliear zigzag configuration positioned within said upright housing and extending generally longitudinally thereof in closely spaced relation to one another to define an elongate zigzag passageway of relatively narrow cross section adapted for receiving a mass of packing elements at the upper end thereof and maintaining the packing elements in the form of a relatively thin continuous layer extending generally vertically in a series of oppositely directed downwardly inclined courses of travel, means for directing a liquid onto the packing elements contained within said passageway, means cooperating with said pair of retaining walls and with the surrounding housing for directing the gas flowing within said housing successively through each of said oppositely directed downwardly inclined courses of travel of the layer of packing elements so that the gas repeatedly flows laterally back and forth through the thin layer of packing elements in said passageway from opposite sides thereof to provide highly effective contact of the gas with the liquid on said packing elements, means for discharging packing elements from the lower end of said passageway so as to cause the layer of packing elements to move downwardly along said passageway, and means for receiving the packing elements which are discharged from said passageway, cleaning the packing elements to remove foreign materials therefrom and then redirecting the packing elements to the upper end of said passageway for replenishing the passageway with packing elements, the discharging and replenishing of the packing elements thus serving to maintain the interstices between the packing elements in said passageway free from clogging so as to achieve highly effective contact of the flowing gas with the liquid.

10. The apparatus as set forth in claim 9 wherein said means for directing a liquid onto the packing elements contained within said passageway comprises a series of nozzles positioned at longitudinally spaced locations along the interior of said housing for discharging the liquid into the stream of gas flowing successively through the layer of packing elements in said passageway.

11. In an apparatus having means for burning a sulfur containing fuel and wherein the combustion gases are subsequently discharged to the atmosphere, the combination therewith of an improved apparatus for scrubbing the combustion gases to remove sulfur dioxide and airborne paticulate material from the combustion gases, said apparatus comprising means defining an elongate generally vertically extending gas permeable passageway of relatively narrow cross section adapted for receiving a mass of packing elements at the upper end thereof and maintaining the same in the passageway in the form of a relatively thin layer, said means comprising a pair of gas permeable retaining walls of nonlinear zigzag configuration extending generally vertically in opposing, spaced relation to one another to define therebetween said elongate vertically extending passageway for the packing elements, means for directing an aqueous liquid onto the packing elements contained within said passageway, means for directing the flowing combustion gases upwardly along a predetermined sinuous path of travel repeatedly passing laterally back and forth through said gas permeable passageway and repeatedly through the thin layer of packing elements in said passageway to thereby effectively contact the combustion gases with the liquid so as to remove sulfur dioxide and particulate material from the gases, means for discharging packing elements from the lower end of said passageway so as to cause the layer of packing elements to move downwardly along said passageway, and means associated with the upper end of said passageway for replenishing the passageway with packing elements, the discharging and replenishing of the packing elements thus serving to maintain the interstices between the packing elements in said passageway free from clogging so as to achieve highly effective contact of the flowing gas with the liquid.

12. In an apparatus having means for burning a sulfur containing fuel and wherein the combustion gases are subsequently discharged to the atmosphere, the combination therewith of an improved apparatus for scrubbing the combustion gases to remove sulfur dioxide and airborne particulate material from the combustion gases, said apparatus comprising an upright hollow housing having an inlet opening in a lower portion thereof for receiving the combustion gases and an outlet opening in an upper portion thereof for discharge of the gases, a pair of opposing gas permeable louvered retaining walls of nonlinear zigzag configuration positioned within said upright housing and extending generally longitudinally thereof in closely spaced relation to one another to define an elongate zigzag passageway of relatively narrow cross section adapted for receiving a mass of packing elements at the upper end thereof and maintaining the packing elements in the form of a relatively thin continuous layer extending generally vertically in a series of oppositely directed downwardly inclined courses of travel, means for directing an aqueous liquid onto the packing elements contained within said passageway, means cooperating with said pair of retaining walls and with the surrounding housing for directing the combustion gases flowing within said housing successively through each of said oppositely directed downwardly inclined courses of travel of the layer of packing elements so that the gases repeatedly flow laterally back and forth through the thin layer of packing elements in said passageway from opposite sides thereof to provide highly effective contact of the combustion gases with the liquid on said packing elements so as to remove sulfur dioxide and particulate material from the gases, means for discharging packing elements from the lower end of said passageway so as to cause the layer of packing elements to move downwardly along said passageway, and means for receiving the packing elements which are discharged from said passageway, cleaning the packing elements to remove foreign materials therefrom and then redirecting the packing elements to the upper end of said passageway for replenishing the passageway with packing elements, the discharging and replenishing of the packing elements thus serving to maintain the interstices between the packing elements in said passageway free from clogging so as to achieve highly effective contact of the flowing gas with the liquid.

13. In an apparatus for heat treating an aggregate material including means for burning a sulfur containing fuel and directing the combustion gases into contact with the aggregate material for heating the same, with the combustion gases being subsequently discharged to the atmosphere, the combination therewith of an improved apparatus for scrubbing the combustion gases to remove sulfur dioxide and airborne particulate material from the combustion gases, said apparatus comprising means defining an elongate generally vertically extending gas permeable passageway of relatively narrow cross section adapted for receiving a mass of packing elements at the upper end thereof and maintaining the same in the passageway in the form of a relatively thin layer, said means comprising a pair of gas permeable retaining walls of nonlinear zigzag configuration extending generally vertically in opposing, spaced relation to one another to define therebetween said elongate vertically extending passageway for the packing elements, means for directing an aqueous liquid onto the packing elements contained within said passageway, means for directing the flowing combustion gases upwardly along a predetermined sinuous path of travel repeatedly passing laterally back and forth through said gas permeable passageway and repeatedly through the thin layer of packing elements in said passageway to thereby effectively contact the combustion gases with the liquid so as to remove sulfur dioxide and particulate material from the gases, means for discharging packing elements from the lower end of said passageway so as to cause the layer of packing elements to move downwardly along said passageway, and means associated with the upper end of said passageway for replenishing the passageway with packing elements, the discharging and replenishing of the packing elements thus serving to maintain the interstices between the packing elements in said passageway free from clogging so as to achieve highly effective contact of the flowing gas with the liquid.

14. In an apparatus for heat treating an aggregate material including means for burning a sulfur containing fuel and directing the combustion gases into contact with the aggregate material for heating the same, with the combustion gases being subsequently discharged to the atmosphere, the combination there with of an improved apparatus for scrubbing the combustion gases to remove sulfur dioxide and airborne particulate material from the combustion gases, said apparatus comprising an upright hollow housing having an inlet openng in a lower portion thereof for receiving the combustion gases and an outlet opening in an upper portion thereof for discharge of the gases, a pair of opposing gas permeable louvered retaining walls of nonlinear zigzag configuration positioned within said upright housing and extending generally longitudinally thereof in closely spaced relation to one another to define an elongate zigzag passageway of relatively narrow cross section adapted for receiving a mass of packing elements at the upper end thereof and maintaining the packing elements in the form of a relatively thin continuous layer extending generally vertically in a series of oppositely directed downwardly inclined courses of travel, means for directing an aqueous liquid onto the packing elements contained within said passageway, means cooperating with said pair of retaining walls and with the surrounding housing for directing the combustion gases flowing within said housing successively through each of said oppositely directed downwardly inclined courses of travel of the layer of packing elements so that the gases repeatedly flow laterally back and forth through the thin layer of packing elements in said passageway from opposite sides thereof to provide highly effective contact of the combustion gases with the liquid on said packing elements so as to remove sulfur dioxide and particulate material from the gases, means for discharging packing elements from the lower end of said passageway so as to cause the layer of packing elements to move downwardly along said passageway, and means for receiving the packing elements which are discharged from said passageway, cleaning the packing elements to remove foreign materials therefrom and then redirecting the packing elements to the upper end of said passageway for replenishing the passageway with packing elements, the discharging and replenishing of the packing elements thus serving to maintain the interstices between the packing elements in said passageway free from clogging so as to achieve highly effective contact of the flowing gas with the liquid.

15. A method of treating a flowing gas with a liquid to remove unwanted materials therefrom, said method comprising maintaining a mass of packing elements in the form of a relatively thin, generally vertically oriented layer extending along a predetermined zigzag path of travel defined by a pair of gas permeable retaining walls of nonlinear zigzag configuration extending generally vertically in opposing, spaced relation to one another, while directing a liquid onto the layer of packing elements, and while also directing a flowing gas upwardly along a predetermined sinuous path of travel repeatedly passing back and forth through the layer of packing elements successively from opposite sides thereof thus provide highly effective contact of the gas with the liquid, and at least periodically moving the layer of packing elements downwardly along the predetermined path of travel by discharging packing elements at the lower end of the path of travel, and replenishing the packing elements being discharged by directing additional packing elements into the upper end of the path of travel and into contact with the gas to thereby maintain the interstices between the packing elements free from clogging so as to achieve highly effective contact of the flowing gas with the liquid.

16. A method as set forth in claim 15 wherein the discharging of the layer of packing elements is carried out continuously at a slow rate of speed.

17. A method as set forth in claim 15 wherein the step of directing a liquid onto the layer of packing elements comprises discharging the liquid into the stream of gas flowing into the layer of packing elements at one or more locations along the predetermined sinuous path of travel of the gas.

18. A method as set forth in claim 15 wherein the step of directing the flowing gas includes directing the gas into the layer of packing elements in an angularly downward direction so as to assist in moving the liquid downwardly over the packing elements.

19. A method as set forth in claim 15 wherein the step of moving the mass of packing elements downwardly along a predetermined zigzag path of travel includes guiding the thin layer of packing elements laterally back and forth along a successive series of oppositely directed downwardly inclined courses of travel, and wherein the step of directly a flowing gas upwardly comprises directing the flowing gas upwardly through the thin layer of packing elements on each of the oppositely directed downwardly inclined courses of travel thereof.

20. A method as set forth in claim 15 wherein the step of replenishing the packing elements comprises providing a reservoir of packing elements in communication with the upper end of the path of travel and directing packing elements from the reservoir into the upper end of the path of travel upon the discharge of packing elements from the lower end of the path of travel.

21. A method as set forth in claim 20 wherein the step of replenishing the packing elements also comprises receiving the discharged packing elements at the lower end of said predetermined path of travel and conveying the packing elements to the reservoir of packing elements at the upper end of said predetermined path of travel.

22. A method as set forth in claim 21 including the further step of cleaning the packing elements to remove foreign materials therefrom prior to conveying the packing elements to the upper end of said predetermined path of travel.

23. A method as set forth in claim 22 wherein the cleaning of the packing elements comprises immersing the packing elements in a liquid bath.

24. A method of continuously treating a flowing gas with a liquid to remove unwanted materials therefrom, said method comprising (a) maintaining a mass of packing elements in the form of a relatively thin generally vertically oriented continuous layer extending along a predetermined zigzag path of travel defined by a pair of gas permeable retaining walls of nonlinear zigzag configuration extending generally vertically in opposing, spaced relation to one another, while (b) directing a liquid onto the layer of packing elements, and while (c) directing a flowing gas upwardly along a predetermined sinuous path of travel passing successively through the zigzag path of travel of the layer of packing elements so that the gas thus repeatedly flows laterally back and forth through the thin layer of packing elements from opposite sides thereof, and (d) at least periodically moving the layer of packing elements downwardly along said predetermined zigzag path by discharging packing elements at the lower end of said zigzag path, (e) receiving the discharged packing elements and cleaning the packing elements to remove foreign materials therefrom, and (f) redirecting the thus cleaned packing elements to the upper end of said predetermined zigzag path to thus bring fresh packing elements into contact with the flowing gas and thereby maintain the interstices between the packing elements free from clogging so as to achieve highly effective contact of the flowing gas with the liquid.

25. In a process including the steps of burning a sulfur containing fuel and subsequently discharging the combustion gases to the atmosphere, the combination therewith of an improved method for scrubbing the combustion gases to remove sulfur dioxide and airborne particulate material from the combustion gases, said method comprising maintaining a mass of packing elements in the form of a relatively thin, generally vertically oriented layer extending along a predetermined zigzag path of travel defined by a pair of gas permeable retaining walls of nonlinear zigzag configuration extending generally vertically in opposing, spaced relation to one another, while directing an aqueous liquid onto the layer of packing elements, and while also directing the flowing combustion gases upwardly along a predetermined sinuous path of travel repeatedly passing back and forth through the layer of packing elements successively from opposite sides thereof to thus contact the flowing gas with the aqueous liquid and remove sulfur dioxide and particulate material from the flowing combustion gases, and at least periodically moving the layer of packing elements downwardly along the predetermined path of travel by discharging packing elements at the lower end of the path of travel, and replenishing the packing elements being discharged by directing additional packing elements into the upper end of the path of travel and into contact with the gas to thereby maintain the interstices between the packing elements free from clogging so as to achieve highly effective contact of the flowing gas with the liquid.

26. In a process including the steps of burning a sulfur containing fuel and subsequently discharging the combustion gases to the atmosphere, the combination therewith of an improved method for scrubbing the combustion gases to remove sulfur dioxide and airborne particulate material from the combustion gases, said method comprising
   (a) maintaining a mass of packing elements in the form of a relatively thin generally vertically oriented continuous layer extending along a predetermined zigzag path of travel defined by a pair of gas permeable retaining walls of nonlinear zigzag configuration extending generally vertically in opposing, spaced relation to one another, while
   (b) directing an aqueous liquid onto the layer of packing elements, and while
   (c) directing the combustion gases upwardly along a predetermined sinuous path of travel passing successively through the zigzag path of travel of the layer of packing elements so that the gases thus repeatedly flow laterally back and forth through the thin layer of packing elements from opposite sides thereof to provide highly effective contact of the combustion gases with the liquid on the packing elements so as to remove sulfur dioxide and particulate material from the gases,
   (d) at least periodically moving the layer of packing elements downwardly along said predetermined zigzag path by discharging packing elements at the lower end of said zigzag path,
   (e) receiving the discharged packing elements and cleaning the packing elements to remove foreign materials therefrom, and
   (f) redirecting the thus cleaned packing elements to the upper end of said predetermined zigzag path to thus bring fresh packing elements into contact with the flowing gas and thereby maintain the interstices between the packing elements free from clogging so as to achieve highly effective contact of the flowing gas with the liquid.

27. In a process for heat treating an aggregate material including the steps of burning a sulfur containing fuel and directing the combustion gases into contact with the aggregate material for heating the same, with the combustion gases being subsequently discharged to the atmosphere, the combination therewith of an improved method for scrubbing the combustion gases to remove sulfur dioxide and airborne particulate material from the combustion gases, said method comprising maintaining a mass of packing elements in the form of a relatively thin, generally vertically oriented layer extending along a predetermined zigzag path of travel defined by a pair of gas permeable retaining walls of nonlinear zigzag configuration extending generally vertically in opposing, spaced relation to one another, while directing an aqueous liquid onto the layer of packing elements, and while also directing the flowing combustion gases upwardly along a predetermined sinuous path of travel repeatedly passing back and forth through the layer of packing elements successively from opposite sides thereof to thus contact the flowing gas with the aqueous liquid and remove sulfur dioxide and particulate material from the flowing combustion gases, and at least periodically moving the layer of packing elements downwardly along the predetermined path of travel by discharging packing elements at the lower end of the path of travel, and replenishing the packing elements being discharged by directing additional packing elements into the upper end of the path of travel and into contact with the gas to thereby maintain the interstices between the packing elements free from clogging so as to achieve highly effective contact of the flowing gas with the liquid.

28. In a process for heat treating an aggregate material including the steps of burning a sulfur containing fuel and directing the combustion gases into contact with the aggregate material for heating the same, with the combustion gases being subsequently discharged to the atmosphere, the combination therewith of an improved method for scrubbing the combustion gases to remove sulfur dioxide and airborne particulate material from the combustion gases, said method comprising
   (a) maintaining a mass of packing elements in the form of a relatively thin generally vertically oriented continuous layer extending along a predetermined zigzag path of travel defined by a pair of gas permeable retaining walls of nonlinear zigzag configuration extending generally vertically in opposing, spaced relation to one another, while
   (b) directing an aqueous liquid onto the layer of packing elements, and while
   (c) directing the combustion gases upwardly along a predetermined sinuous path of travel passing successively through the zigzag path of travel of the layer of packing elements so that the gases thus repeatedly flow laterally back and forth through the thin layer of packing elements from opposite sides thereof to provide highly effective contact of the combustion gases with the liquid on the packing elements so as to remove sulfur dioxide and particulate material from the gases,
   (d) at least periodically moving the layer of packing elements downwardly along said predetermined zigzag path by discharging packing elements at the lower end of said zigzag path,
   (e) receiving the discharged packing elements and cleaning the packing elements to remove foreign materials therefrom, and
   (f) redirecting the thus cleaned packing elements to the upper end of said predetermined zigzag path to thus bring fresh packing elements into contact with the flowing gas and thereby maintain the interstices between the packing elements free from clogging so as to achieve highly effective contact of the flowing gas with the liquid.

* * * * *

UNITED STATES PATENT AND TRADEMARK OFFICE
CERTIFICATE OF CORRECTION

PATENT NO. : 4,256,045
DATED : March 17, 1981
INVENTOR(S) : Allen S. Johnson, Jr.

It is certified that error appears in the above-identified patent and that said Letters Patent are hereby corrected as shown below:

Column 1, Line 26, "taken" should be --take--.

Column 7, Line 29, "1/4 inch" should be --3/4 inch--.

Column 8, CLAIM 1, Line 45, "sectio" should be --section--.

Column 9, CLAIM 9, Line 60, "nonliear" should be --nonlinear--.

Column 13, CLAIM 15, Line 35, after "thereof" insert --to--; same column, CLAIM 19, Line 66, "directly" should be --directing--.

Signed and Sealed this

Seventh Day of July 1981

[SEAL]

Attest:

RENE D. TEGTMEYER

Attesting Officer    Acting Commissioner of Patents and Trademarks